Figure 1:
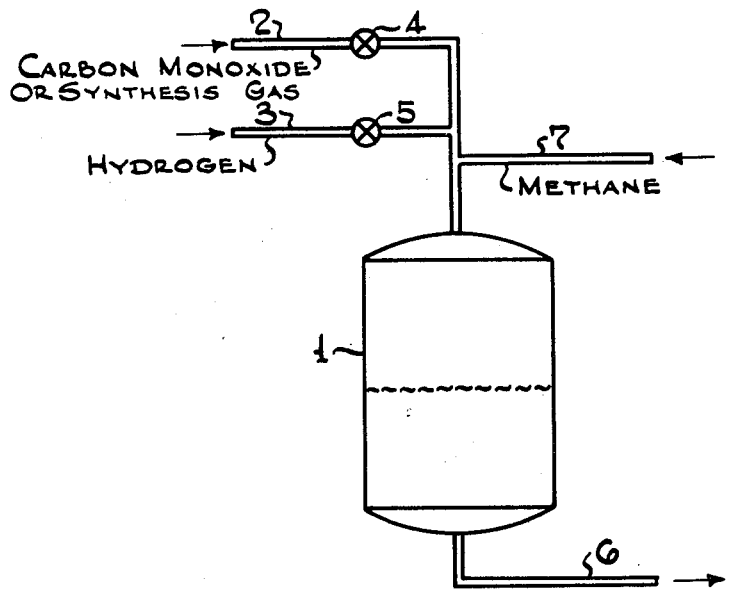

Patented Feb. 28, 1950

2,498,845

UNITED STATES PATENT OFFICE 2,498,845

HYDROCARBON SYNTHESIS REACTION

Lloyd B. Smith and Robert W. Krebs, Baton Rouge, La., assignors to Standard Oil Development Company, a corporation of Delaware Application May 7, 1946, Serial No. 667,786

5 Claims. (Cl. 260—449.6)

The present invention is concerned with an improved hydrocarbon synthesis operation. It is more specifically concerned with an improved process for the treatment of the catalyst, and is particularly directed to a means of controlling the temperature of a synthesis reaction immediately following the reduction of revivification of the catalyst. In accordance with the process of the present invention hydrogen, after the reduction of the catalyst, is displaced by methane before the introduction of synthesis gas.

It is well known in the art to produce hydrocarbon constituents containing more than one carbon atom in the molecule by reacting hydrogen with oxides of carbon under suitable temperature and pressure conditions in the presence of a suitable catalyst. Usually in a process for the production of hydrocarbon constituents containing more than one carbon atom in the molecule the preferred temperatures of the reaction are in the range from about 350° F. to about 750° F. In order to secure satisfactory yields of the desired products it is very desirable that the temperature not vary appreciably from the desired operating temperature for a given catalyst. The catalysts employed to aid the reaction are, for example, cerium, chromium, cobalt, manganese, osmium, palladium, titanium, zinc, iron, and oxides of other compounds of these metals. Mixtures of these catalysts are also employed or are impregnated with suitable agents adapted to increase their efficiency or strength. The catalyst may be in any suitable form, such as a fluid catalyst or may be pilled or in a granular form.

In operations of this character, it is necessary to reduce the new charge of catalyst before use, converting the metal oxides to metals. This is normally accomplished by treating with hydrogen at temperatures in the range from about 500° F. to 1000° F., and at atmospheric or elevated pressures up to about 400 lbs./sq. in. Also, in operations of this type carbon, under certain operating conditions, tends to build up on the catalyst which reduces its activity. It is thus necessary sometimes to revivify or regenerate the catalyst which is generally done by treating the catalyst at prescribed temperature and pressure conditions with hydrogen gas. In a conventional procedure after the catalyst has been treated with hydrogen gas to reduce the oxide or to remove the carbon from the catalyst to the desired amount the hydrogen stream is discontinued and the synthesis stream started. The synthesis gas stream comprises oxides of carbon and hydrogen. In operations of this character it has heretofore been rather difficult to control the temperatures in the reaction zone, particularly in initiating the reaction. For example, when using a catalyst comprising iron oxide the temperature may rise in the first several hours to as high as 600° F. to 700° F. and at times as much as 1000 F., when it is desired to maintain the temperature at about 550° F. When this occurs an unduly large amount of carbon is precipitated or formed on the catalyst in the early stages of the operation. Thus the life of the catalyst and its activity is materially lessened. Various procedures and methods have been suggested for controlling or reducing the carbon initially formed on the catalyst at the start of the on-cycle. We have discovered a process by which it is possible to appreciably reduce the amount of carbon formed on the catalyst in the early stages of the on-reaction. In accordance with the process of our invention, before actually introducing the synthesis gas stream we completely purge the catalyst with an inert gas such as methane.

Figure 2:
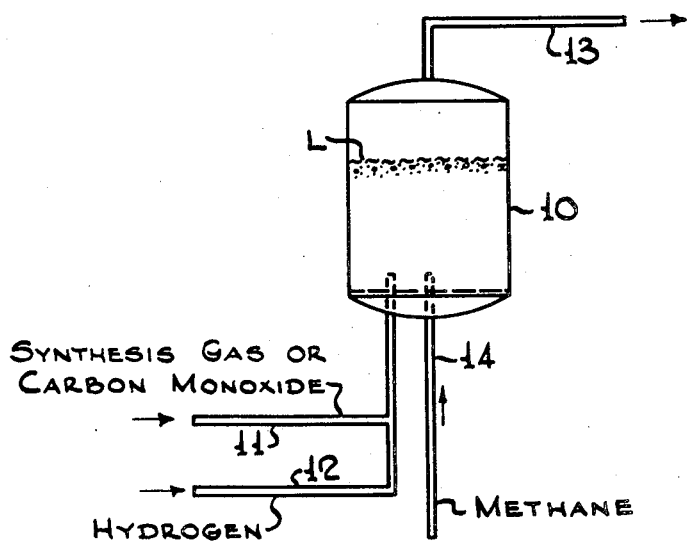

The process of our invention may be readily understood by reference to the drawings showing modifications of the same. Figure 1 illustrates a modification of our invention employing a fixed bed, while Figure 2 illustrates a modification wherein a fluid type catalyst is employed.

Referring specifically to Figure 1 carbon monoxide and hydrogen in desired ratio is introduced into reaction zone 1 by means of feed lines 2 and 3. The amounts introduced are controlled by means of valves 4 and 5. The temperature and pressure conditions in reaction zone 1 are maintained at the desired figure. Reaction zone 1 contains a catalyst preferably selected from the iron group, as for example, iron, cobalt or nickel. After the desired time of contact between the vapors and the catalyst the reaction products are withdrawn from reaction zone 1 by means of line 6 and handled in any desirable manner. Usually these products are passed to a distillation zone wherein fractions having the desired specifications are segregated.

In accordance with the process of our invention, after the catalyst has become fouled with carbon to the extent that its activity is reduced and it is necessary to discontinue the synthesis reaction, the carbon monoxide stream is discontinued.

We then continue to treat with hydrogen at the desired temperatures and pressures in order to remove the carbon from the catalyst. This reaction is conducted at a temperature in the range from about 500° F. to 1000° F., preferably with a temperature of about 600° F. to 800° F. After the catalyst has been treated in a manner to reduce the carbon to the desired value, we discontinue the introduction of the hydrogen stream. Methane is then introduced into the reaction zone 1 by means of line 7. Sufficient methane is introduced into reaction zone 1 so as to completely remove the hydrogen from the catalyst. At this point we continue to feed methane and to introduce synthesis gases comprising hydrogen and carbon monoxide in the desired ratio. We then progressively reduce the amount of methane introduced until the gases being introduced into the reaction zone 1 comprises 100% synthesis gases and continue the last mentioned feed for the major portion of the synthesis run.

Referring specifically to Figure 2, synthesis gases comprising carbon monoxide and hydrogen are introduced into reaction zone 10 by means of lines 11 and 12, respectively. The reaction zone contains a suitable fluid catalyst, the upper level of which is at point L. The temperature and pressure conditions are maintained in reaction zone 10 at the desired level. After sufficient time of contact, the reaction products are withdrawn overhead from reaction zone 10 by means of line 13. When the activity of the catalyst due to carbon formation is reduced to a point at which it is no longer economical to run the reaction, we stop the introduction of carbon monoxide and continue to treat the catalyst or regenerate it by introducing hydrogen and raising the temperature of the reaction zone to a temperature from about 600° F. to 800° F. After the carbon content of the catalyst has been reduced to the desired value, we stop the introduction of hydrogen and introduce methane into reaction zone 10 by means of line 14. After the catalyst has been completely purged of hydrogen, we start to introduce synthesis gases comprising carbon monoxide and hydrogen and continue to progressively increase the quantity of synthesis gases as compared with the quantity of methane until no methane is introduced.

The process of our invention may be widely varied. In general, our invention comprises first purging the catalyst with a methane gas in order to completely remove the hydrogen utilized in the regeneration of the catalyst and then to progressively introduce a greater and greater quantity of synthesis gases comprising hydrogen and carbon monoxide until we no longer introduce any methane. By operating in this manner, we are able to control the temperature during the starting of the reaction cycle and prevent it from varying to any appreciable extent.

The temperatures employed in the synthesis reaction may be widely varied. For example, when using a cobalt catalyst, the temperature is generally in the range from about 350° F. to about 450° F., whereas when an iron catalyst is utilized the temperature in the reaction zone is maintained in the range from about 550° F. to about 750° F. When employing a cobalt catalyst, we use about two volumes of hydrogen per volume of carbon monoxide, whereas when an iron catalyst is employed, it is the usual procedure to use about one volume of hydrogen per volume of carbon monoxide.

The process of the present invention may be more fully understood by reference to the following example illustrating the same.

Example 1

Spent iron catalyst was regenerated by treating with hydrogen gas at temperatures in the range from 600° F. to 700° F. At the end of the regeneration period methane gas was introduced and gradually synthesis gases were introduced, gradually building up to 100% synthesis gases. Throughout a 10 hour period of putting the reactor on stream, the temperature of the catalyst bed was increased steadily from about 470° F. to about 550° F. In other runs in which the present process was not applied, the temperatures increased to between 600° F. and 700° F. before control at the desired temperature level of 550° F. was established.

Example 2

Two runs were made using an iron catalyst. In the first run, the catalyst was regenerated using hydrogen and the synthesis gas was introduced directly. In the second run, before the introduction of the synthesis gases, the hydrogen was purged with a methane stream. The results of these two runs are as follows.

| Synthesis Hours | Per cent Carbon On Catalyst | |
|---|---|---|
| | Run 1 | Run 2 |
| 5 | 4.2 | 1.5 |
| 10 | 4.7 | 2.5 |
| 15 | 4.7 | 2.8 |
| 20 | 4.8 | 2.9 |
| 25 | 4.8 | 2.9 |
| 30 | 4.8 | 3.0 |

From the above data, it is readily apparent that if the catalyst is purged with methane before the introduction of the synthesis gases, the amount of carbon formed on the catalyst during the initial hours will be materially decreased.

In accordance with our process the hydrogen is completely removed from the reaction zone prior to the on-cycle. This is extremely desirable since the ratio of hydrogen to oxide of carbon in the reaction zone will not vary during the initial time of the on-cycle. Thus it is possible in accordance with our invention, to predetermine the ratio of hydrogen to oxide of carbon in the feed gases with respect to the particular catalyst and selected operating conditions and not have a varying ratio of hydrogen to oxide of carbon in the initial stage of the on-cycle, which otherwise would be the case.

The process of the present invention is not to be limited by any theory as to mode of operation, but only in and by the following claims in which it is desired to claim all novelty insofar as the prior art permits.

We claim:

1. An improved process for the synthesis of hydrocarbons containing more than one carbon atom in the molecule which comprises treating a finely divided fluidized iron type catalyst with hydrogen, then treating said catalyst with methane gas in the absence of oxide of carbon, then contacting said catalyst with synthesis gases comprising hydrogen and oxides of carbon in gradually increasing amounts together with methane under synthesizing conditions until the synthesis gases represent 100% of the fresh feed to start a synthesis run, and continuing the last-mentioned feed for the major portion of the synthesis run.

2. The process of claim 1 in which the synthesis gases replace said methane completely within about 10 hours.

3. A process in accordance with claim 1 in which the synthesis run is carried out at a temperature in the range from about 550° F. to about 750° F.

4. An improved process for the manufacture of hydrocarbon constituents containing more than one carbon atom in the molecule which comprises contacting a finely divided fluidized iron-type catalyst with a feed gas mixture comprising hydrogen and oxides of carbon at a temperature in the range from about 350° to 750° F., withdrawing reaction products overhead, discontinuing the introduction of oxides of carbon after the activity of the catalyst has decreased due to the formation of carbon and continuing to introduce hydrogen at elevated temperatures, discontinuing the introduction of hydrogen and introducing methane gas in the absence of oxides of carbon, then gradually introducing synthesis gases comprising hydrogen and oxides of carbon to the reaction zone to replace the methane in increasing amounts, until the synthesis gases represent 100% of the fresh feed to start a new synthesis run, and continuing the last-mentioned feed for the major portion of said synthesis run.

5. Process in accordance with claim 4 in which the hydrogen is introduced alone into the reaction zone at a temperature in the range of about 600° F. to 800° F. and in which the synthesis gases are introduced into the reaction zone maintained at said contacting temperature.

LLOYD B. SMITH.
ROBERT W. KREBS.

REFERENCES CITED

The following references are of record in the file of this patent:

UNITED STATES PATENTS

| Number | Name | Date |
| --- | --- | --- |
| 2,111,469 | Francon | Mar. 15, 1938 |
| 2,209,190 | Currie | July 23, 1940 |
| 2,244,196 | Herbert | June 3, 1941 |

FOREIGN PATENTS

| Number | Country | Date |
| --- | --- | --- |
| 533,459 | Great Britain | Feb. 13, 1941 |

OTHER REFERENCES

Ser. No. 414,926, Feisst (A. P. C.), published Apr. 20, 1943.